(12) United States Patent
Kim

(10) Patent No.: US 11,740,390 B2
(45) Date of Patent: Aug. 29, 2023

(54) LIQUID LENS AND LENS ASSEMBLY INCLUDING SAME

(71) Applicant: LG INNOTEK CO., LTD., Seoul (KR)

(72) Inventor: Uijun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 229 days.

(21) Appl. No.: 17/057,615

(22) PCT Filed: May 23, 2019

(86) PCT No.: PCT/KR2019/006157
§ 371 (c)(1),
(2) Date: Nov. 20, 2020

(87) PCT Pub. No.: WO2019/225973
PCT Pub. Date: Nov. 28, 2019

(65) Prior Publication Data
US 2021/0199859 A1    Jul. 1, 2021

(30) Foreign Application Priority Data

May 23, 2018 (KR) .................. 10-2018-0058607

(51) Int. Cl.
*G02B 3/14* (2006.01)
(52) U.S. Cl.
CPC ..................... *G02B 3/14* (2013.01)
(58) Field of Classification Search
CPC .. G02B 3/14; G02B 27/646; G02B 2207/115; G02B 7/021; G02B 7/028; G02B 3/12; G03B 2205/0053; G03B 3/10; G03B 30/00; G03B 17/12; H04N 5/2254
See application file for complete search history.

(56) References Cited

U.S. PATENT DOCUMENTS

| | | |
|---|---|---|
| 2008/0231965 A1 | 9/2008 | Weekamp |
| 2008/0259463 A1 | 10/2008 | Shepherd |
| 2008/0267603 A1 | 10/2008 | Jung et al. |
| 2010/0020407 A1 | 1/2010 | Takai et al. |
| 2010/0202054 A1 | 8/2010 | Niederer |
| 2010/0232028 A1 | 9/2010 | Takai |
| 2010/0271709 A1* | 10/2010 | Takai ............... G02B 26/004 359/665 |

(Continued)

FOREIGN PATENT DOCUMENTS

| | | |
|---|---|---|
| CN | 103180762 A | 6/2013 |
| CN | 107850696 A | 3/2018 |
| EP | 1662276 A1 | 5/2006 |

(Continued)

*Primary Examiner* — Darryl J Collins
*Assistant Examiner* — Matthew Y Lee
(74) *Attorney, Agent, or Firm* — Birch, Stewart, Kolasch & Birch, LLP

(57) ABSTRACT

A liquid lens unit according to one embodiment comprises: a first plate including a cavity for accommodating a conductive first liquid and a nonconductive second liquid; a first electrode arranged on the first plate; a second electrode arranged under the first plate; a second plate arranged on the first electrode; a third plate arranged under the second electrode; and an elastic member arranged between the first plate and the third plate.

5 Claims, 9 Drawing Sheets

(56) References Cited

U.S. PATENT DOCUMENTS

2012/0037820 A1     2/2012   Komi

FOREIGN PATENT DOCUMENTS

| | | |
|---|---:|---:|
| GB | 571912 A | 9/1945 |
| JP | 2007-519971 A | 7/2007 |
| JP | 4402164 B1 | 1/2010 |
| JP | 2010-262247 A | 11/2010 |
| KR | 20060058020 A | 5/2006 |
| KR | 20060129321 A | 12/2006 |
| KR | 10-2008-0038627 A | 5/2008 |
| KR | 100843473 B1 | 7/2008 |
| KR | 20100040316 A | 4/2010 |
| KR | 10-2012-0033696 A | 4/2012 |
| KR | 10-1805128 B1 | 12/2017 |
| KR | 10-1821189 B1 | 1/2018 |
| TW | 200909901 A | 3/2009 |
| WO | WO 2007/058451 A1 | 5/2007 |

\* cited by examiner

LIQUID LENS AND LENS ASSEMBLY INCLUDING SAME

CROSS REFERENCE TO RELATED APPLICATIONS

This application is the National Phase of PCT International Application No. PCT/KR2019/006157, filed on May 23, 2019, which claims priority under 35 U.S.C. 119(a) to Patent Application No. 10-2018-0058607, filed in the republic of Korea on May 23, 2018, all of which are hereby expressly incorporated by reference into the present application.

TECHNICAL FIELD

Embodiments relate to a liquid lens and a lens assembly including the same.

BACKGROUND ART

People who use portable devices demand optical devices that have high resolution, are small, and have various photographing functions. For example, the various photographing functions may include at least one of an optical zoom-in/zoom-out function, an auto-focusing (AF) function, or a hand-tremor compensation or optical image stabilizer (OIS) function.

Conventionally, in order to realize the aforementioned various photographing functions, a method of combining a plurality of lenses and directly moving the combined lenses is used. In the case in which the number of lenses is increased, however, the size of an optical device may be increased.

The auto-focusing function and the hand-tremor compensation function are performed by moving or tilting several lenses, which are fixed to a lens holder and are aligned with an optical axis, along the optical axis or in a direction perpendicular to the optical axis. To this end, a separate lens-moving apparatus is required to move a lens assembly composed of a plurality of lenses. However, the lens-moving apparatus consumes a lot of power, and a cover glass needs to be provided separately from a camera module in order to protect the lens-moving apparatus, thus leading to an increase in the overall size of the conventional camera module. In order to solve this problem, research has been conducted on a liquid lens configured to electrically adjust the curvature of an interface between two types of liquids in order to perform the auto-focusing function and the hand-tremor compensation function.

DISCLOSURE

Technical Problem

Embodiments provide a liquid lens unit, which is capable of preventing deformation attributable to an increase in temperature and of preventing a change in diopter attributable thereto, and a lens assembly including the same.

The objects to be accomplished by the disclosure are not limited to the above-mentioned object, and other objects not mentioned herein will be clearly understood by those skilled in the art from the following description.

Technical Solution

A liquid lens according to an embodiment includes a first plate including a cavity accommodating a first liquid and a second liquid, the first liquid being conductive and the second liquid being non-conductive, a first electrode disposed on the first plate, a second electrode disposed under the first plate, a second plate disposed on the first electrode, a third plate disposed under the second electrode, and an elastic member disposed between the first plate and the third plate.

For example, at least a portion of the elastic member may be received in a receiving recess disposed in the lower surface of the first plate.

For example, the first electrode may extend along the side surface and the lower surface of the first plate, which forms a sidewall of the cavity, and the elastic member may be disposed on the lower surface of the first plate between the first electrode and the second electrode and may have a toroidal shape.

For example, the elastic member may include an electrode plate disposed over at least portions of the upper surface and the outer circumferential surface thereof, the liquid lens may further include a third electrode disposed inside the first plate, a dielectric layer disposed between the third electrode and the electrode plate disposed on the upper surface of the elastic member, and a fourth electrode disposed on the lower surface of the first plate so as to be electrically connected to the electrode plate disposed on the outer circumferential surface, and the third electrode, the dielectric layer, and the electrode plate disposed on the outer circumferential surface may at least partially overlap each other in a vertical direction.

For example, the third electrode may extend from the edge of the first plate toward an optical axis such that at least a portion of the lower surface thereof overlaps the electrode plate in the vertical direction.

For example, the dielectric layer may allow movement of the elastic member in the vertical direction depending on variation in pressure in the cavity.

For example, the elastic member may include a protruding portion formed at the upper portion thereof that is received in the receiving recess.

For example, the elastic member may be disposed along the inner surface of the third plate between the second electrode and the third plate.

For example, the elastic member may have a tubular shape and may include therein a material having a lower density than the first liquid and the second liquid.

A lens assembly according to an embodiment may include a holder including a first opening and a second opening facing the first opening in a direction perpendicular to an optical-axis direction, and a liquid lens unit disposed between the first opening and the second opening. Here, the liquid lens unit may include a first plate including a cavity accommodating a first liquid and a second liquid, the first liquid being conductive and the second liquid being non-conductive, a first electrode disposed on the first plate, a second electrode disposed under the first plate, a second plate disposed on the first electrode, a third plate disposed under the second electrode, and an elastic member disposed between the first plate and the third plate.

Advantageous Effects

A liquid lens according to an embodiment has reduced risk of deformation by virtue of an elastic member even when the volume of a liquid is increased due to an increase in temperature.

A camera module according to an embodiment is capable of measuring a change in capacitance attributable to deformation of an elastic member, thereby compensating for a change in an interface attributable to an increase in temperature based thereon.

The effects achievable through the embodiments are not limited to the above-mentioned effects, and other effects not mentioned herein will be clearly understood by those skilled in the art from the following description.

BEST MODE

Figure 1:
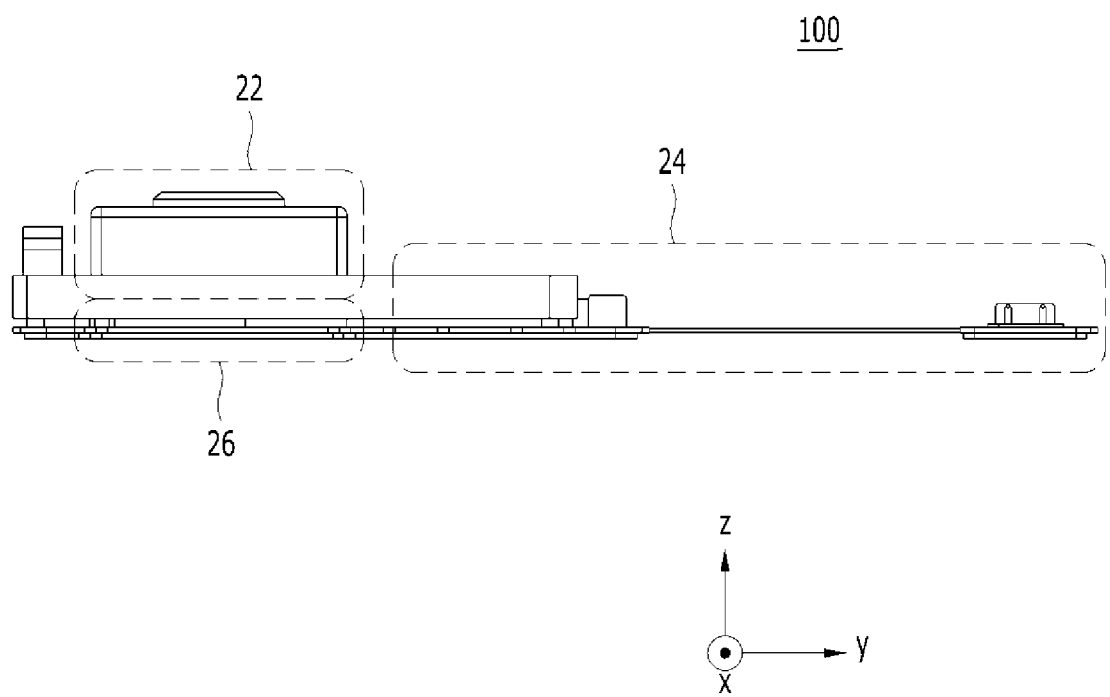
FIG. 1 illustrates a schematic side view of a camera module according to an embodiment.

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

The terms used in the present specification are used for explaining a specific exemplary embodiment, not to limit the present disclosure. Singular expressions include plural expressions unless clearly specified otherwise in context. In the specification, the terms "comprising" or "including" shall be understood to designate the presence of features, numbers, steps, operations, elements, parts, or combinations thereof, but not to preclude the presence or addition of one or more other features, numbers, steps, operations, elements, parts, or combinations thereof.

Unless otherwise defined, all terms including technical and scientific terms used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a lens assembly and a camera module including the same according to embodiments will be described using the Cartesian coordinate system, but the embodiments are not limited thereto. That is, in the Cartesian coordinate system, the x-axis, the y-axis and the z-axis are perpendicular to one another, but the embodiments are not limited thereto. That is, the x-axis, the y-axis, and the z-axis may cross one another, rather than being perpendicular to one another.

Hereinafter, a camera module 100 according to an embodiment will be described with reference to FIGS. 1 to 4.

FIG. 1 illustrates a schematic side view of the camera module 100 according to an embodiment.

Referring to FIG. 1, the camera module 100 may include a lens assembly 22, a control circuit 24, and an image sensor 26.

First, the lens assembly 22 may include a plurality of lens units and a holder in which the plurality of lens units is accommodated. As will be described below, the plurality of lens units may include a liquid lens, and may further include a first lens unit or a second lens unit. The plurality of lens units may include first and second lens units and a liquid lens unit.

The control circuit 24 serves to supply a driving voltage (or an operation voltage) to the liquid lens unit.

The control circuit 24 and the image sensor 26 described above may be disposed on a single printed circuit board (PCB), but this is merely given by way of example, and the embodiment is not limited thereto.

When the camera module 100 according to the embodiment is applied to an optical device (or an optical instrument), the configuration of the control circuit 24 may be designed in different ways depending on the specifications required in the optical device. In particular, the control circuit 24 may be implemented as a single chip so as to reduce the magnitude of the driving voltage applied to the lens assembly 22. Thereby, the size of an optical device mounted in a portable device may be further reduced.

Figure 2:
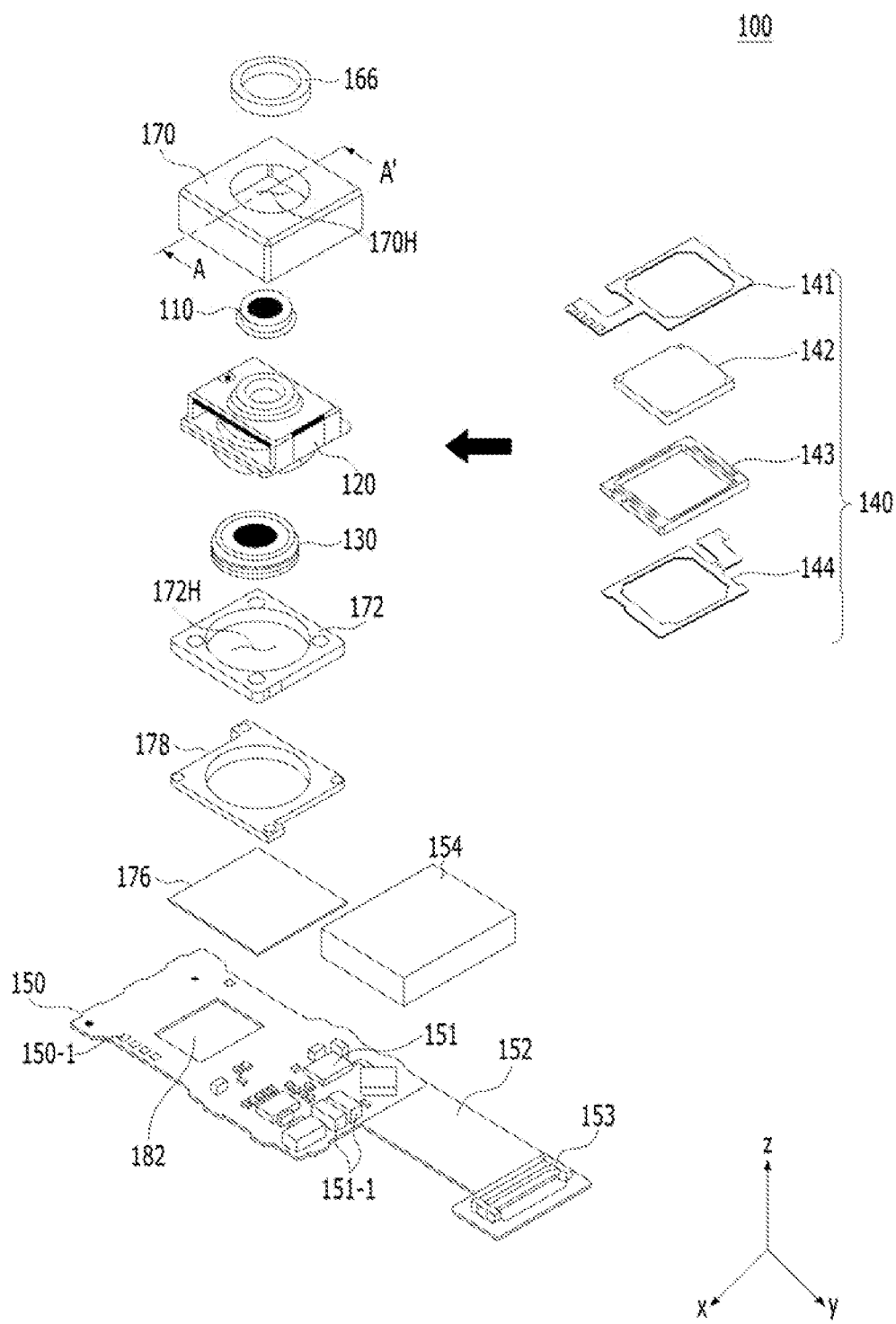
FIG. 2 illustrates an exploded perspective view of an embodiment of the camera module shown in FIG. 1.

FIG. 2 illustrates an exploded perspective view of an embodiment of the camera module 100 shown in FIG. 1.

Referring to FIG. 2, the camera module 100 may include a lens assembly, a main board 150, and an image sensor 182. In addition, the camera module 100 may further include a first cover 170 and a middle base 172. In addition, the camera module 100 may further include at least one adhesive member. The at least one adhesive member serves to couple or fix a liquid lens unit 140 to a holder 120. In addition, the camera module 100 may further include a sensor base 178 and a filter 176, or may not include the sensor base 178 and the filter 176, as shown in FIG. 2. In addition, the camera module 100 may further include a circuit cover 154. The circuit cover 154 may have an electromagnetic shielding function.

In addition, the camera module 100 shown in FIG. 2 may further include a sensor base 178 and a filter 176.

According to the embodiment, at least one of the components 110 to 176 of the camera module 100B shown in FIG. 2 may be omitted. Alternatively, at least one component different from the components 110 to 176 shown in FIG. 2 may be further included in the camera module 100.

Figure 3:
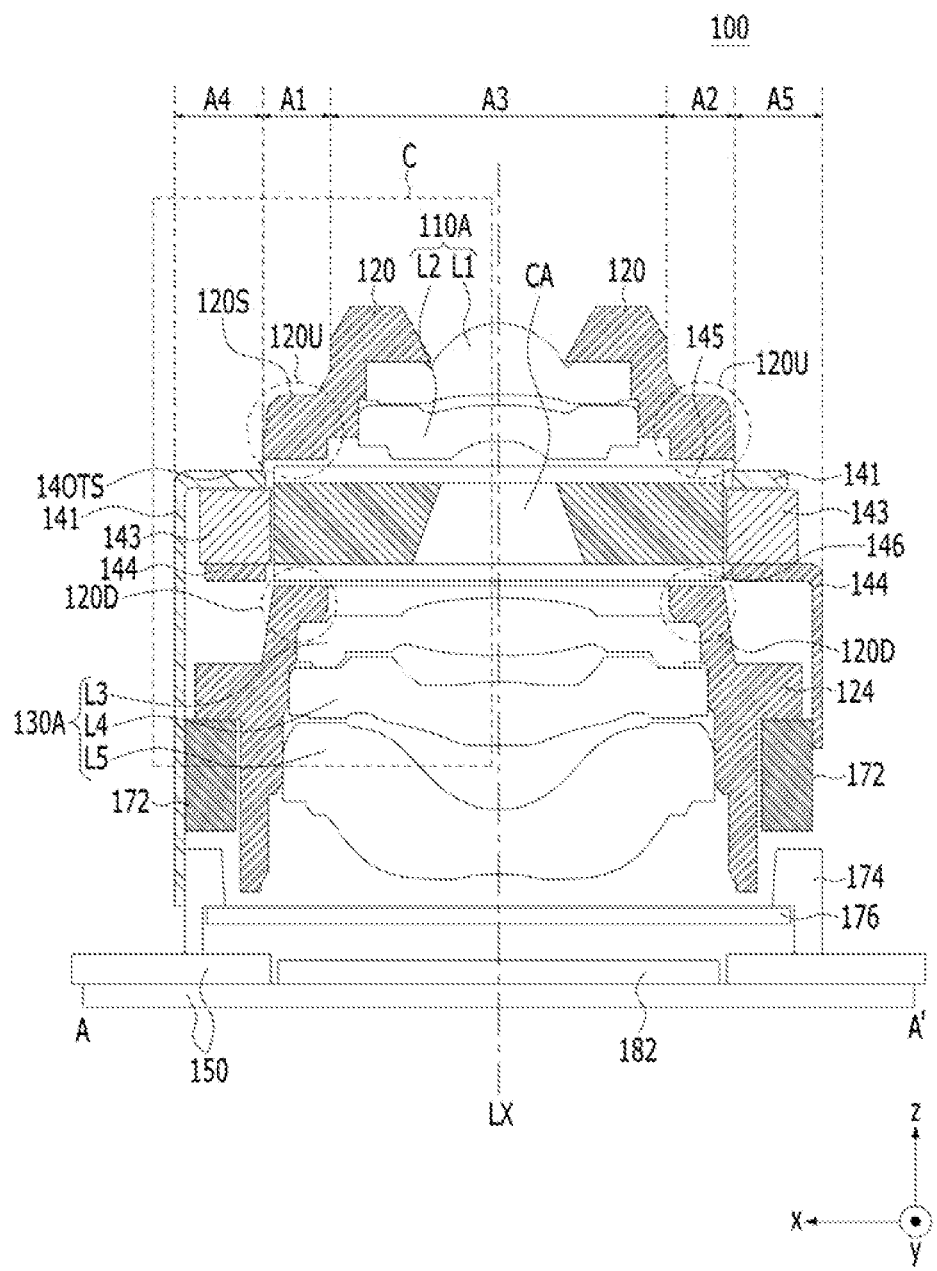
FIG. 3 illustrates a cross-sectional view of the camera module shown in FIG. 2.

FIG. 3 is a cross-sectional view of the camera module 100 shown in FIG. 2. That is, FIG. 3 is a cross-sectional view taken along line A-A' in the camera module 100 shown in FIG. 2. For convenience of description, the first cover 170, the circuit cover 154, and the connector 153 shown in FIG. 2 are not illustrated in FIG. 3, and may in practice be omitted from the camera module 100.

Referring to FIGS. 2 and 3, the lens assembly may include at least one of the liquid lens unit 140, the holder 120, a first lens unit 110 or 110A, or a second lens unit 130 or 130A, and may correspond to the lens assembly 22 shown in FIG. 1. The lens assembly may be disposed on the main board 150.

In the lens assembly, the first lens unit 110 and the second lens unit 130 may be referred to as a 'first solid lens unit' and a 'second solid lens unit', respectively, in order to be distinguished from the liquid lens unit 140.

The first lens unit 110 may be disposed at the upper side of the lens assembly, and may be a region on which light is incident from outside the lens assembly. That is, the first lens unit 110 or 110A may be disposed above the liquid lens unit 140 within the holder 120. The first lens unit 110 or 110A may be implemented using a single lens, or may be implemented using two or more lenses that are aligned along a center axis to form an optical system.

Here, the center axis may be an optical axis LX of the optical system, which is formed by the first lens unit 110 or 110A, the liquid lens unit 140, and the second lens unit 130 or 130A included in the camera module 100A, or may be an axis parallel to the optical axis LX. The optical axis LX may correspond to the optical axis of the image sensor 182. That is, the first lens unit 110 or 110A, the liquid lens unit 140, the second lens unit 130 or 130A, and the image sensor 182 may be aligned along the optical axis LX through active alignment (AA).

Here, active alignment may mean an operation of aligning the optical axes of the first lens unit 110 or 110A, the second lens unit 130 or 130A, and the liquid lens unit 140 with each other and adjusting an axial relationship or distance relationship between the image sensor 182 and the lens units 110 or 110A, 130 or 130A, and 140 in order to acquire an improved image.

In an embodiment, active alignment may be performed through an operation of analyzing image data generated by the image sensor 182, which receives light introduced from a specific object via at least one of the first lens unit 110 or 110A, the second lens unit 130 or 130A, or the liquid lens unit 140. For example, active alignment may be performed in the following sequence.

In one example, after active alignment (first alignment), which adjusts relative positions between the first lens unit 110 or 110A and the second lens unit 130 or 130A, which are fixedly mounted to the holder 120, and the image sensor 182, is completed, active alignment (second alignment), which adjusts relative positions between the liquid lens unit 140, which is inserted into the holder 120, and the image sensor 182, may be performed. The first alignment may be performed as a gripper grips the middle base 172 and displaces the middle base 172 to various positions, and the second alignment may be performed as the gripper grips a spacer 143 of the liquid lens unit 140 and displaces the spacer to various positions.

However, active alignment may be performed in any other sequence different from the above-described sequence.

Assuming the case in which the middle base 172 is omitted, active alignment may be performed in the state in which the gripper grips a protruding portion 124 of the holder 120. At this time, when the protruding portion 124 has a small thickness, active alignment may not be accurately performed. In order to prevent this, the camera module 100A may include the middle base 172, which is thicker than the protruding portion 124 of the holder 120. Management of the thickness of the holder 120 may be necessary in order to form the holder 120, which has a complicated shape compared to the shape of the middle base 172, using injection molding or the like. When the thickness of a portion of the holder 120 for active alignment is not sufficient for gripping, the middle base 172 may be added so that active alignment may be performed in the state in which the gripper grips a portion of the middle base 172. However, when the thickness of the protruding portion 124 is sufficiently large, the middle base 172 may be omitted. In addition, the protruding portion 124 and the middle base 172 may be coupled to each other using an adhesive member, for example, epoxy.

In another example, after active alignment (third alignment), which adjusts relative positions between the first lens unit 110 or 110A, the second lens unit 130 or 130A, and the liquid lens unit 140, which are fixedly mounted to the holder 120, is completed, active alignment (fourth alignment), which adjusts relative positions between the lenses of the lens assembly, which have completely undergone the third alignment, and the image sensor 182 may be performed. The third alignment may be performed as a gripper grips the spacer 143 of the liquid lens unit 140 and displaces the spacer to various positions, and the fourth alignment may be performed as the gripper grips the middle base 172 and displaces the middle base to various positions.

In addition, as illustrated in FIG. 3, the first lens unit 110A may include, for example, two lenses L1 and L2, but this is merely given by way of example, and the first lens unit 110A may include one lens, or three or more lenses.

In addition, an exposure lens may be disposed at the upper side of the first lens unit 110 or 110A. Here, the exposure lens may be the outermost lens among the lenses included in the first lens unit 110 or 110A. That is, the lens L1 located at the uppermost side of the first lens unit 110A may protrude upwards, and therefore, may function as the exposure lens. The exposure lens faces the risk of damage to the surface thereof since it protrudes outwards from the holder 120. When the surface of the exposure lens is damaged, the quality of an image captured by the camera module 100A may be deteriorated. Therefore, in order to prevent or minimize damage to the surface of the exposure lens, a cover glass may be disposed, or a coating layer may be formed on the top of the exposure lens. Alternatively, in order to prevent damage to the surface of the exposure lens, the exposure lens may be formed of a wear-resistant material having higher rigidity than the lenses of the other lens units.

In addition, the outer diameter of each of the lenses L1 and L2 included in the first lens unit 110A may gradually increase in a direction approaching the bottom (e.g. in the −z-axis direction), but the embodiment is not limited thereto.

Figure 4:
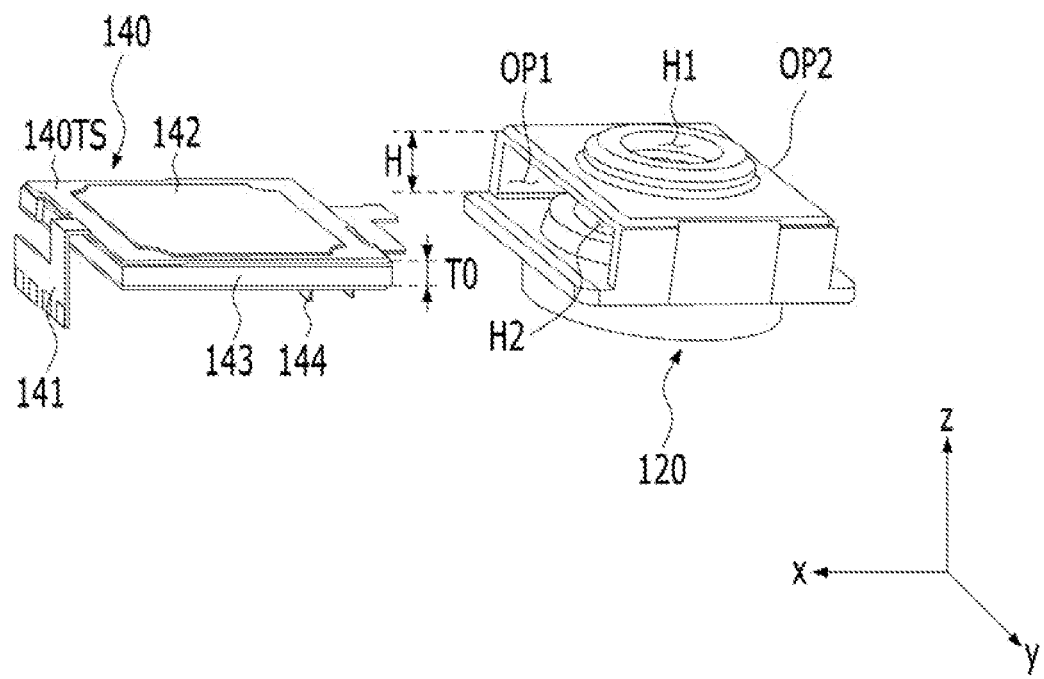
FIG. 4 is a view for explaining the holder and the liquid lens unit shown in FIGS. 1 and 3.

FIG. 4 is a view for explaining the holder 120 and the liquid lens unit 140 shown in FIGS. 2 and 3. That is, FIG. 4 illustrates an exploded perspective view of the holder 120 and the liquid lens unit 140. The holder 120 shown in FIG. 4 may include first and second holes H1 and H2 and first to fourth sidewalls.

FIG. 2 illustrates a plan view of the state before a first connection substrate 141 and a second connection substrate 144 are bent in the −z-axis direction, and FIG. 4 illustrates the state after the first connection substrate 141 and the second connection substrate 144 are bent in the −z-axis direction. Further, as shown in FIG. 3, the spacer 143 may be disposed between the first connection substrate 141 and the second connection substrate 144, and may be disposed so as to protrude from at least one of a first or second opening OP1 or OP2 in the holder 120.

In addition, the spacer 143 may be disposed so as to surround the side surface of the liquid lens 142 in a ring shape. The spacer 143 may include, at the upper portion and the lower portion thereof, uneven portions in order to increase coupling force with the connection substrates 141 and 144 using an adhesive material. The connection substrates 141 and 144 may have a shape corresponding to the shape of the spacer 143, and may include a ring shape.

The first and second holes H1 and H2 may be formed respectively in the upper portion and the lower portion of the holder 120 to open the upper portion and the lower portion of the holder 120, respectively. Here, the first hole H1 and the second hole H2 may be through-holes. The first lens unit 110 or 110A may be accommodated in, mounted in, seated in, in contact with, fixed to, provisionally fixed to, supported by, coupled to, or disposed in the first hole H1, which is formed in the holder 120, and the second lens unit 130 or 130A may be accommodated in, mounted in, seated in, in contact with, fixed to, provisionally fixed to, supported by, coupled to, or disposed in the second hole H2, which is formed in the holder 120.

In addition, the first and second sidewalls of the holder 120 may be disposed so as to face each other in a direction perpendicular to the direction of the optical axis LX (e.g. in the x-axis direction), and the third and fourth sidewalls may be disposed so as to face each other in a direction perpendicular to the direction of the optical axis LX (e.g. in the y-axis direction). In addition, as illustrated in FIG. 4, the first sidewall of the holder 120 may include a first opening OP1, and the second sidewall thereof may include a second opening OP2 having a shape that is the same as or similar to that of the first opening OP1. Thus, the first opening OP1 disposed in the first sidewall and the second opening OP2 disposed in the second sidewall may be disposed so as to face each other in a direction perpendicular to the direction of the optical axis LX (e.g. in the x-axis direction).

The inner space in the holder 120, in which the liquid lens unit 140 is disposed, may be open due to the first and second openings OP1 and OP2. In this case, the liquid lens unit 140 may be inserted through the first or second opening OP1 or OP2 so as to be mounted in, seated in, in contact with, fixed to, provisionally fixed to, supported by, coupled to, or disposed in the inner space in the holder 120. For example, the liquid lens unit 140 may be inserted into the inner space in the holder 120 through the first opening OP1.

As such, in order to allow the liquid lens unit 140 to be inserted into the inner space in the holder 120 through the first or second opening OP1 or OP2, the size of the first or second opening OP1 or OP2 in the holder 120 in the direction of the optical axis LX may be greater than the cross-sectional area of the liquid lens unit 140 in the y-axis direction and the z-axis direction. For example, the height H corresponding to the size of each of the first and second openings OP1 and OP2 in the direction of the optical axis LX may be greater than the thickness TO of the liquid lens unit 140.

The second lens unit 130 or 130A may be disposed below the liquid lens unit 140 within the holder 120. The second lens unit 130 or 130A may be spaced apart from the first lens unit 110 or 110A in the optical-axis direction (e.g. in the z-axis direction).

The light introduced into the first lens unit 110 or 110A from outside the camera module 100A may pass through the liquid lens unit 140 and may be introduced into the second lens unit 130 or 130A. The second lens unit 130 or 130A may be implemented using a single lens, or may be implemented using two or more lenses, which are aligned along the center axis to form an optical system. For example, as illustrated in FIG. 3, the second lens unit 130A may include three lenses L3, L4 and L5, but this is merely given by way of example, and two or fewer lenses or four or more lenses may be included in the second lens unit 130 or 130A.

In addition, the outer diameter of each of the lenses L3, L4 and L5 included in the second lens unit 130A may gradually increase in a direction approaching the bottom (e.g. in the −z-axis direction), but the embodiment is not limited thereto.

Unlike the liquid lens unit 140, each of the first lens unit 110 or 110A and the second lens unit 130 or 130A may be a solid lens formed of glass or plastic, but the embodiment is not limited as to a specific material of each of the first lens unit 110 or 110A and the second lens unit 130 or 130A.

In addition, referring to FIG. 3, the liquid lens unit 140 may include first to fifth areas A1, A2, A3, A4 and A5.

The first area A1 is an area disposed inside the first opening OP1 in the holder 120, the second area A2 is an area disposed inside the second opening OP2 in the holder 120, and the third area A3 is an area between the first area A1 and the second area A2. The fourth area A4 is an area protruding from the first opening OP1 in the holder 120 and disposed outside the holder 120 at the side of the first opening OP1. The fifth area A5 is an area protruding from the second opening OP2 in the holder 120 and disposed outside the holder 120 at the side of the second opening OP2.

In addition, as shown in FIG. 2, the liquid lens unit 140 may include a first connection substrate (or an individual electrode connection substrate) 141, a liquid lens (or a liquid lens body) 142, the spacer 143, and a second connection substrate (or a common electrode connection substrate) 144.

The first connection substrate 141 may electrically connect a plurality of first electrodes (not shown) included in the liquid lens 142 to the main board 150, and may be disposed above the liquid lens 142. The first connection substrate 141 may be implemented as a flexible printed circuit board (FPCB).

In addition, the first connection substrate 141 may be electrically connected to an electrode pad (not shown), which is formed on the main board 150, via a connection pad (not shown), which is electrically connected to each of a plurality of first electrodes. To this end, after the liquid lens unit 140 is inserted into the inner space of the holder 120, the first connection substrate 141 may be subjected to bending in the −z-axis direction toward the main board 150, and thereafter the connection pad (not shown) and the electrode pad (not shown) may be electrically connected to each other via conductive epoxy. In another embodiment, the first connection substrate 141 may be connected to a first holder surface electrode, which is conductive and is disposed, formed, or coated on the surface of the holder 120, so as to be electrically connected to the main board 150 via the first holder surface electrode, which is conductive and is disposed on the surface of the holder 120, but the embodiment is not limited thereto.

The second connection substrate 144 may electrically connect a second electrode (not shown) included in the liquid lens 142 to the main board 150, and may be disposed below the liquid lens 142. The second connection substrate 144 may be implemented as an FPCB or a single metal substrate (a conductive metal plate). Here, the first and second electrodes will be described later in detail with reference to FIG. 5A.

The second connection substrate 144 may be electrically connected to an electrode pad, which is formed on the main board 150, via a connection pad, which is electrically connected to the second electrode. To this end, after the liquid lens unit 140 is inserted into the inner space of the holder 120, the second connection substrate 144 may be subjected to bending in the −z-axis direction toward the main board 150. In another embodiment, the second connection substrate 144 may be connected to a second holder surface electrode, which is conductive and is disposed, formed, or coated on the surface of the holder 120, so as to be electrically connected to the main board 150 via the second holder surface electrode, which is conductive and is disposed on the surface of the holder 120, but the embodiment is not limited thereto.

The liquid lens 142 may include a cavity CA. As shown in FIG. 3, the open area in the direction in which light is introduced into the cavity CA may be smaller than the open area in the opposite direction. Alternatively, the liquid lens 142 may be disposed such that the direction of inclination of the cavity CA is opposite what is illustrated. That is, unlike the illustration of FIG. 3, the open area in the direction in which light is introduced into the cavity CA may be greater than the open area in the opposite direction. In addition, when the liquid lens 142 is disposed such that the direction of inclination of the cavity CA is opposite what is illustrated, the arrangement of all or some of the components included in the liquid lens 142 may be changed, or only the direction of inclination of the cavity CA may be changed and the arrangement of the remaining components may not be changed, according to the direction of inclination of the liquid lens 142. The concrete configuration of the liquid lens 142 will be described later in detail with reference to FIG. 5A.

The spacer 143 may be disposed so as to surround the liquid lens 142, and may protect the liquid lens 142 from external impacts. To this end, the spacer 143 may have a shape that allows the liquid lens 142 to be mounted in, seated in, in contact with, fixed to, provisionally fixed to, supported by, coupled to, or disposed in the spacer.

For example, the spacer 143 may include a hollow region 143H in which the liquid lens 142 is accommodated, and a frame configured to surround the hollow region 143H formed in the center thereof. As such, the spacer 143 may have a centrally-hollowed square planar shape (hereinafter referred to as a '☐'-shaped form), but the embodiment is not limited thereto.

In addition, the spacer 143 may be disposed between the first connection substrate 141 and the second connection substrate 144, and may be disposed so as to protrude from at least one of the first or second opening OP1 or OP2 in the holder 120. That is, at least a portion of the spacer 143 may be shaped so as to protrude, along with the first and second connection substrates 141 and 144, from at least one of the first or second sidewall of the holder 120 in the direction perpendicular to the optical axis LX (e.g. in the x-axis direction). The reason for this is that the length of the spacer 143 in the x-axis direction is greater than the length of the holder 120 in the x-axis direction. Thus, portions of the spacer 143, which protrude from the first and second sidewalls, may respectively correspond to the fourth area A4 and the fifth area A5 shown in FIG. 3.

In addition, the spacer 143 may be brought into contact with a gripper when the spacer 143 is inserted into the holder 120 and during active alignment.

In addition, at least a portion of the spacer 143 may be disposed in at least one of the first opening OP1 or the second opening OP2. In the case of FIG. 3, the spacer 143 is illustrated as not being disposed in the first opening OP1 and the second opening OP2. However, unlike the illustration, as illustrated in FIGS. 2 and 4, it can be appreciated that at least a portion of the spacer 143 is disposed in each of the first and second openings OP1 and OP2 since the spacer 143 has a '☐'-shaped form and surrounds the liquid lens 142.

In addition, at least a portion of the liquid lens 142 may be disposed in at least one of the first opening OP1 or the second opening OP2. Referring to FIG. 3, it can be appreciated that a first plate 147 of the liquid lens 142, which is a component of the liquid lens 142, is disposed in each of the first and second openings OP1 and OP2.

In addition, only at least a portion of the spacer 143 may be disposed in each of the first and second openings OP1 and OP2, and the liquid lens 142 may not be disposed therein.

In addition, referring to FIG. 3, the holder 120 may include a holder upper area 120U disposed above the liquid lens unit 140 and a holder lower area 120D disposed below the liquid lens unit 140. In this case, each of the first and second adhesive members 162A and 164A may couple each of the holder upper area 120U and the holder lower area 120D to the liquid lens unit 140.

The first cover 170 may be disposed so as to surround the holder 120, the liquid lens unit 140, and the middle base 172, and may protect these components 120, 140 and 172 from external impacts. In particular, since the first cover 170 is disposed, a plurality of lenses, which forms an optical system, may be protected from external impacts.

In addition, in order to allow the first lens unit 110 or 110A disposed in the holder 120 to be exposed to external light, the first cover 170 may include an upper opening 170H formed in the upper surface of the first cover 170.

In addition, a window formed of a light-transmitting material may be disposed in the upper opening 170H, whereby it is possible to prevent foreign substances such as dust or moisture from entering the camera module 100A.

In addition, the first cover 170 may be disposed so as to cover the upper surface and the first to fourth sidewalls of the holder 120.

Meanwhile, referring to FIGS. 2 and 3, the middle base 172 may be disposed so as to surround the second hole H2 in the holder 120. To this end, the middle base 172 may include an accommodating hole 172H for accommodating the second hole H2 therein. The inner diameter of the middle base 172 (i.e. the diameter of the accommodating hole 172H) may be equal to or greater than the outer diameter of the second hole H2.

Here, each of the accommodating hole 172H in the middle base 172 and the second hole H2 is illustrated as having a circular shape, but the embodiment is not limited thereto, and these holes may be changed to various other shapes.

In the same manner as the upper opening 170H in the first cover 170, the accommodating hole 172H may be formed near the center of the middle base 172 at a position corresponding to the position of the image sensor 182, which is disposed in the camera module 100.

The middle base 172 may be mounted on the main board 150 so as to be spaced apart from a circuit element 151 on the main board 150. That is, the holder 120 may be disposed on the main board 150 so as to be spaced apart from the circuit element 151.

The main board 150 may be disposed below the middle base 172, and may include a recess in which the image sensor 182 may be mounted, seated, tightly disposed, fixed, provisionally fixed, supported, coupled, or accommodated, the circuit element 151, a connection part (or an FPCB) 152, and a connector 153.

The circuit element 151 of the main board 150 may constitute a control module, which controls the liquid lens unit 140 and the image sensor 182. Here, the control module will be described later with reference to FIG. 11. The circuit element 151 may include at least one of a passive element or an active element, and may have any of various areas and heights. The circuit element 151 may be provided in a plural number, and may have a height greater than the height of the main board 150 so as to protrude outwards. The plurality of circuit elements 151 may be disposed so as not to overlap the holder 120 in the direction parallel to the optical axis LX. For example, the plurality of circuit elements 151 may include a power inductor, a gyro sensor, and the like, but the embodiment is not limited as to a specific type of the circuit elements 151.

The main board 150 may include a holder area in which the holder 120 is disposed and an element area in which the plurality of circuit elements 151 is disposed.

The main board 150 may be implemented as a rigid flexible printed circuit board (RFPCB) including the FPCB 152. The FPCB 152 may be subjected to bending depending on the requirements of the space in which the camera module 100 is mounted.

The image sensor 182 may perform a function of converting the light that has passed through the first lens unit 110, the liquid lens unit 140, and the second lens unit 130 of the lens assembly 110, 120, 130 and 140 into image data. More specifically, the image sensor 182 may generate image data by converting light into analog signals via a pixel array including a plurality of pixels and synthesizing digital signals corresponding to the analog signals.

Meanwhile, the connector 153 may electrically connect the main board 150 to a power supply or some other devices (e.g. an application processor) outside the camera module 100A.

Hereinafter, an embodiment of a method of manufacturing the camera module 100 will be described with reference to the accompanying drawings.

First, the image sensor 182 may be mounted on the main board 150, and the holder 120 in which the middle base 172 and the second cover 174 are coupled or disposed may be mounted on, seated on, in contact with, provisionally fixed to, supported by, coupled to, or disposed on the main board 150.

At this time, active alignment (first alignment) between the first lens unit 110 or 110A and the second lens unit 130 or 130A, which are mounted in the holder 120, and the image sensor 182 may be performed. The first alignment may be performed by adjusting the positions of the middle base 172 and the holder 120 while supporting opposite sides of the middle base 172. The first alignment may be performed while moving a jig, which presses and fixes opposite sides of the middle base 172. The middle base 172 may be fixed to the main board 150 in the completed state of the first alignment.

Subsequently, the liquid lens unit 140 may be inserted into the holder 120 through at least one of the first opening OP1 or the second opening OP2 in the holder 120, and active alignment between the liquid lens unit 140 and the image sensor 182 may be performed as second alignment. The second alignment may be performed by adjusting the position of the liquid lens unit 140 while supporting the liquid lens unit 140 in the x-axis direction. The second alignment may be performed while moving a jig, which presses and fixes the liquid lens unit 140 in the x-axis direction.

Subsequently, each of the first connection substrate 141 and the second connection substrate 144 may be subjected to bending so as to be electrically connected to the main board 150. After the bending process, a soldering process is performed to electrically connect each of the first connection substrate 141 and the second connection substrate 144 to the main board 150.

Subsequently, the first lens unit 110, the holder 120, the second lens unit 130, the liquid lens unit 140, and the middle base 172 are covered with the first cover 170 so as to complete the camera module 100A.

Meanwhile, some of the plurality of circuit elements 151 shown in FIG. 2 may cause electromagnetic interference (EMI) or noise. In particular, among the plurality of circuit elements 151, a power inductor 151-1 may cause greater EMI than other elements. In order to block EMI or noise, the circuit cover 154 may be disposed so as to cover the circuit elements 151 disposed in the element area of the main board 150.

In addition, when the circuit cover 154 is disposed so as to cover the circuit elements 151, the circuit elements 151 disposed on the main board 150 may be protected from external impacts. To this end, the circuit cover 154 may include an accommodating space for accommodating therein and covering the circuit elements 151, in consideration of the shape and position of the circuit elements 151 disposed on the main board 150.

Meanwhile, the filter 176 may filter light within a specific wavelength range, among the light that has passed through the first lens unit 110 or 110A, the liquid lens unit 140, and the second lens unit 130 or 130A. The filter 176 may be an infrared (IR) light blocking filter or an ultraviolet (UV) light blocking filter, but the embodiment is not limited thereto. The filter 176 may be disposed above the image sensor 182. The filter 176 may be disposed inside the sensor base 178. For example, the filter 176 may be disposed or mounted in an inner recess in the sensor base 178 or on a stepped portion thereof.

The sensor base 178 may be disposed below the middle base 172, and may be attached to the main board 150. The sensor base 178 may surround the image sensor 182, and may protect the image sensor 182 from foreign substances or external impacts.

The main board 150 may be disposed below the sensor base 178, the sensor base 178 may be mounted on the main board 150 so as to be spaced apart from the circuit elements 151, and the holder 120 in which the middle base 172, the second lens unit 130 or 130A, the liquid lens unit 140, and the first lens unit 110 or 110A are disposed may be disposed above the sensor base 178.

In addition, the camera module 100 shown in FIG. 2 may not include the sensor base 178 and the filter 176.

Figure 5A:
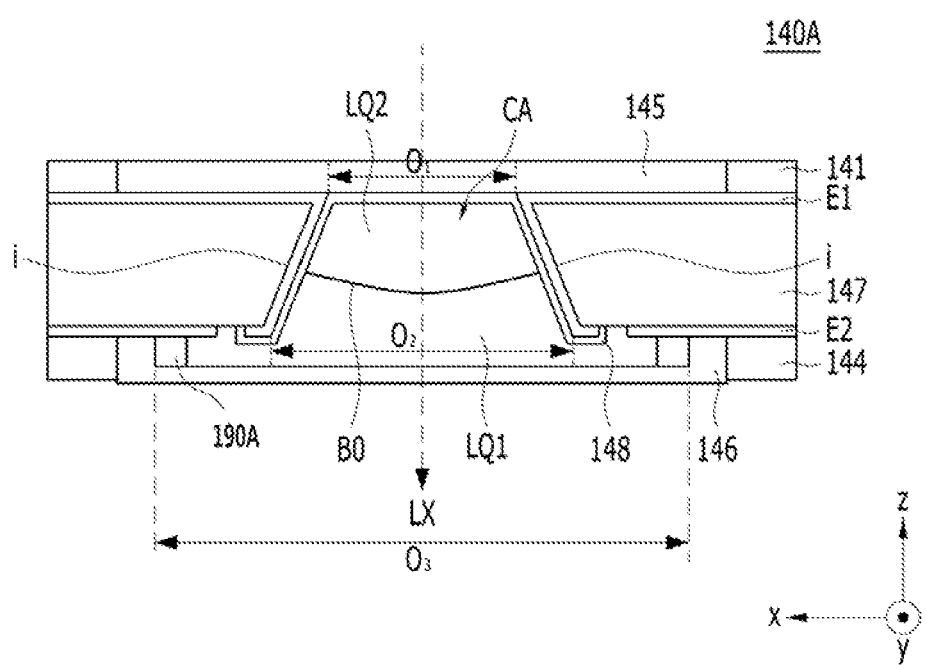
FIGS. 5A and 5B illustrate cross-sectional views of an embodiment of the liquid lens unit including a liquid lens according to an embodiment.
Figure 5B:
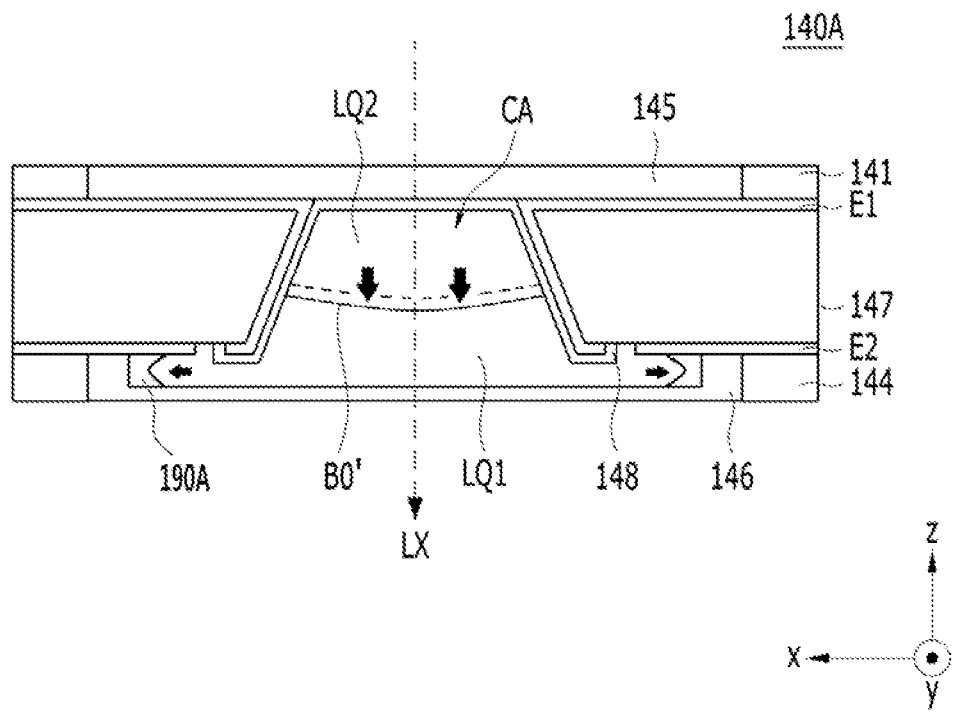

Hereinafter, an embodiment 140A of the liquid lens unit 140 included in the camera module 100 according to the embodiment described above will be described with reference to FIGS. 5A and 5B. FIGS. 5A and 5B illustrate cross-sectional views of the embodiment 140A of the liquid lens unit 140 including the liquid lens according to the embodiment described above.

The liquid lens unit 140A shown in FIGS. 5A and 5B may include the first connection substrate 141, the liquid lens 142, the spacer 143, and the second connection substrate 144. The spacer 143 has been described above, and thus a duplicate description thereof will be omitted. For convenience of description, illustration of the spacer 143 is omitted from FIGS. 5A and 5B.

The liquid lens 142 may include a plurality of different types of liquids LQ1 and LQ2, first to third plates 147, 145 and 146, first and second electrodes E1 and E2, and an insulation layer 148.

The liquids LQ1 and LQ2 may be accommodated in the cavity CA, and may include a first liquid LQ1, which is conductive, and a second liquid (or an insulative liquid) LQ2, which is non-conductive. The first liquid LQ1 and the second liquid LQ2 may be immiscible with each other, and an interface BO may be formed at the contact portion between the first and second liquids LQ1 and LQ2. For example, the second liquid LQ2 may be disposed on the first liquid LQ1, but the embodiment is not limited thereto.

In addition, in the cross-sectional shape of the liquid lens 142, the edges of the first and second liquids LQ2 and LQ1 may be thinner than the center portions thereof.

The inner side surface of the first plate 147 may form a sidewall i of the cavity CA. The first plate 147 may include upper and lower openings having a predetermined inclined surface. That is, the cavity CA may be defined as an area that is surrounded by the inclined surface of the first plate 147, a third opening that is in contact with the second plate 145, and a fourth opening that is in contact with the third plate 146.

The diameter of a wider opening among the third and fourth openings may be changed depending on the field of view (FOV) required for the liquid lens 142 or the role of the liquid lens 142 in the camera module 100A. According to the embodiment, the size (the area or the width) of the fourth opening O2 may be greater than the size (the area or the width) of the third opening O1. Here, the size of each of the third and fourth openings may be the cross-sectional area in the horizontal direction (e.g. the x-axis direction and the y-axis direction). For example, the size of each of the third and fourth openings may mean the radius when the opening has a circular cross-section, and may mean the diagonal length when the opening has a square cross-section.

Each of the third and fourth openings may take the form of a hole having a circular cross-section. The interface BO formed by the two liquids may be moved along the inclined surface of the cavity CA by a driving voltage.

The first liquid LQ1 and the second liquid LQ2 are charged, accommodated, or disposed in the cavity CA in the first plate 147. In addition, the cavity CA is the area through which the light that has passed through the first lens unit 110 or 110A passes. Thus, the first plate 147 may be formed of a transparent material, or may include impurities so that light does not easily pass therethrough.

The electrodes may be disposed respectively on one surface and the other surface of the first plate 147. A plurality of first electrodes E1 may be disposed on one surface (e.g. the upper surface, the side surface, and the lower surface) of the first plate 147 so as to be spaced apart from the second electrode E2. The second electrode E2 may be disposed on at least a portion of the other surface (e.g. the lower surface) of the first plate 147 and may be in direct contact with the first liquid LQ1.

In addition, the first electrodes E1 may be "n" electrodes (hereinafter, referred to as 'individual electrodes'), and the second electrode E2 may be a single electrode (hereinafter, referred to as a 'common electrode'). Here, "n" may be a positive integer of 2 or greater.

Each of the first and second electrodes E1 and E2 may include at least one electrode sector. For example, the first electrode E1 may include two or more electrode sectors, and the second electrode E2 may include at least one electrode sector. For example, the plurality of first electrodes E1 may include a plurality of electrode sectors sequentially disposed in the clockwise direction (or in the counterclockwise direction) about the optical axis. Here, the electrode sector means a portion of the electrode.

A portion of the second electrode E2 (i.e. an electrode sector of the second electrode E2) disposed on the other surface of the first plate 147 may be exposed to the first liquid LQ1, which is conductive.

Each of the first and second electrodes E1 and E2 may be formed of a conductive material, e.g. metal.

In addition, the second plate 145 may be disposed on one surface of the first electrodes E1. That is, the second plate 145 may be disposed above the first plate 147. Specifically, the second plate 145 may be disposed on the upper surface of the first electrodes E1 and the cavity CA.

The third plate 146 may be disposed on one surface of the second electrode E2. That is, the third plate 146 may be disposed below the first plate 147. Specifically, the third plate 146 may be disposed under the lower surface of the second electrode E2 and the cavity CA. In addition, the third plate may include at least a lower surface, an upper surface, and an inner surface, which extends from the edge of the upper surface in a vertical direction (e.g. the Z-axis direction) and is in contact with the lower surface of the second electrode E.

The second plate 145 and the third plate 146 may be disposed so as to face each other, with the first plate 147 interposed therebetween. In addition, at least one of the second plate 145 or the third plate 146 may be omitted.

At least one of the second or third plate 145 or 146 may have a rectangular planar shape. The third plate 146 may be brought into contact with and bonded to the first plate 147 on a bonding area thereof around the edge.

Each of the second and third plates 145 and 146 may be an area through which light passes, and may be formed of a light-transmitting material. For example, each of the second and third plates 145 and 146 may be formed of glass, and for convenience of processing, may be formed of the same material. In addition, the edge of each of the second and third plates 145 and 146 may have a rectangular shape, without being necessarily limited thereto.

The second plate 145 may be configured to allow the light introduced from the first lens unit 110 or 110A to travel into the cavity CA in the first plate 145.

The third plate 146 may be configured to allow the light that has passed through the cavity CA in the first plate 145 to travel to the second lens unit 130 or 130A. The third plate 146 may be in direct contact with the first liquid LQ1.

According to the embodiment, the third plate 146 may have a diameter greater than the diameter of a wider opening among the third and fourth openings in the first plate 147. In addition, the third plate 146 may include a peripheral area spaced apart from the first plate 147.

In addition, the actual effective lens area of the liquid lens 142 may be narrower than the diameter (e.g. O2) of a wider opening among the third and fourth openings in the first plate 147.

The insulation layer 148 may be disposed so as to cover a portion of the lower surface of the second plate 145 in the upper area of the cavity CA. That is, the insulation layer 148 may be disposed between the second liquid LQ2 and the second plate 145.

In addition, the insulation layer 148 may be disposed so as to cover a portion of the first electrode E1, which forms the sidewall of the cavity CA. In addition, the insulation layer 148 may be disposed on the lower surface of the first plate 147 so as to cover a portion of the first electrode E1 and the first plate 147. Thus, contact between the first electrode E1 and the first liquid LQ1 and contact between the first electrode E1 and the second liquid LQ2 may be prevented by the insulation layer 148. Unlike what is illustrated, the insulation layer 148 may extend in a peripheral direction so as to cover at least a portion of the second electrode E2.

The insulation layer 148 may cover one electrode among the first and second electrodes E1 and E2 (e.g. the first electrode E1), and may expose a portion of the other electrode (e.g. the second electrode E2) so that electrical energy is applied to the first liquid LQ1, which is conductive.

In the case of the camera module 100 according to the embodiment, the filter 176 for the blocking of ultraviolet light or infrared light is disposed between the middle base 172 and the image sensor 182, and filters light within a specific wavelength range, among the light that has passed through the first lens unit 110, the liquid lens 142, and the second lens unit 130. In addition, such an infrared light blocking filter or an ultraviolet light blocking filter is mounted in an inner recess in the sensor base 178.

At least one substrate, for example, the first connection substrate 141 and the second connection substrate 144, serves to supply a voltage to the liquid lens 142. To this end, the plurality of first electrodes E1 may be electrically connected to the first connection substrate 141, and the second electrode E2 may be electrically connected to the second connection substrate 144.

When a driving voltage is applied to the first and second electrodes E1 and E2 through the first connection substrate 141 and the second connection substrate 144, the interface BO between the first liquid LQ1 and the second liquid LQ2 may be deformed, and thus at least one of the shape, such as a curvature, or the focal length of the liquid lens 142 may be changed (or adjusted). For example, the focal length of the liquid lens 142 may be adjusted as at least one of the flexure or the inclination of the interface BO formed in the liquid lens 142 is changed according to the driving voltage. When the deformation or the radius of curvature of the interface BO is controlled, the liquid lens 142, the lens assembly 110, 120, 130 and 140 including the liquid lens 142, the camera module 100, and the optical device may perform an auto-focusing (AF) function and a hand-tremor compensation or optical image stabilizer (OIS) function.

The first connection substrate 141 may transmit four different driving voltages (hereinafter, referred to as 'individual voltages') to the liquid lens 142, and the second connection substrate 144 may transmit one driving voltage (hereinafter, referred to as a 'common voltage') to the liquid lens 142. The common voltage may include a DC voltage or an AC voltage. When the common voltage is applied in a pulse form, the pulse width or the duty cycle may be constant. The individual voltages supplied via the first connection substrate 141 may be applied to the plurality of first electrodes E1 (or the plurality of electrode sectors) exposed at the respective corners of the liquid lens 142.

Although not illustrated, when conductive epoxy is disposed between the first connection substrate 141 and the plurality of first electrodes E1, the first connection substrate 141 and the plurality of first electrodes E1 may be in contact with each other, may be coupled to each other, and may be in electrical conduction with each other. In addition, when conductive epoxy is disposed between the second connection substrate 144 and the second electrode E2, the second connection substrate 144 and the second electrode E2 may be in contact with each other, may be coupled to each other, and may be in electrical conduction with each other.

In addition, the first connection substrate 141 and the plurality of first electrodes E1 may be implemented as separate elements, or may be integrally formed. In addition, the second connection substrate 144 and the second electrode E2 may be implemented as separate elements, or may be integrally formed.

Meanwhile, in general, when the interface BO between the first liquid LQ1 and the second liquid LQ2 is parallel to the x-y plane, the liquid lens is in an optical state in which the diopter thereof is zero. In this state, when the temperature increases, at least a portion of the liquid lens may be deformed due to an increase in the volume of various components constituting the liquid lens, and thus the diopter value may change. For example, when the temperature increases in the state in which the diopter of the liquid lens is zero, the volume of each of the first liquid LQ1 and the second liquid LQ2 increases, and thus the pressure in the cavity CA increases. Accordingly, the third plate 146 may be deformed while bending and protruding in the −z-axis direction.

The main heat source that causes thermal deformation is the image sensor 182 disposed inside the camera module 100, and in the case in which the camera module 100 is mounted in a mobile terminal or the like, heat generated in the device such as a mobile terminal is additionally applied thereto.

In order to minimize deformation attributable to heat, the liquid lens unit 140A according to the embodiment may further include an elastic member 190A. The elastic member 190A may be configured so as to be deformed such that the volume thereof is reduced by the pressure applied thereto from the surroundings. Such an elastic member may include a silicon or polymer material, without being necessarily limited thereto.

The elastic member 190A shown in FIGS. 5A and 5B is illustrated as having a rectangular-shaped cross-section, without being necessarily limited thereto. For example, the elastic member 190A has a rectangular tubular cross-section, and a medium having a lower density than the first liquid LQ1 and the second liquid LQ2 may be charged in the inner space thereof. As a material that is capable of being charged in the inner space of the elastic member 190A, a gas having a low density, such as helium, may be used, but this is given only by way of example, without being necessarily limited thereto.

The elastic member 190A may have a circular, elliptical, or polygonal planar shape. For example, when the elastic member 190A has a rectangular planar shape, the elastic member 190A may have a toroidal shape.

For example, the elastic member 190A may be disposed along the inner surface of the third plate 146 between the second electrode E2 and the third plate 146.

In the case in which the elastic member 190A is disposed inside the liquid lens unit 140A, components of the liquid lens unit 140A, particularly the second liquid LQ2, increases in volume upon an increase in temperature, and thus the interface BO' moves in the Z-axis direction. At this time, the volume of the elastic member 190A is reduced to an extent equivalent to the increase in the volume of other components, thereby enabling minimization of the deformation of the third plate 146.

The elastic member 190A may be variously changed in shape and position. Hereinafter, the configurations of the liquid lens units 140B, 140C, 140D and 140E according to other embodiments will be described with reference to FIGS. 6 to 9C.

FIGS. 6 to 9C illustrate respective examples of the configurations of liquid lens units according to other embodiments.

Figure 6:
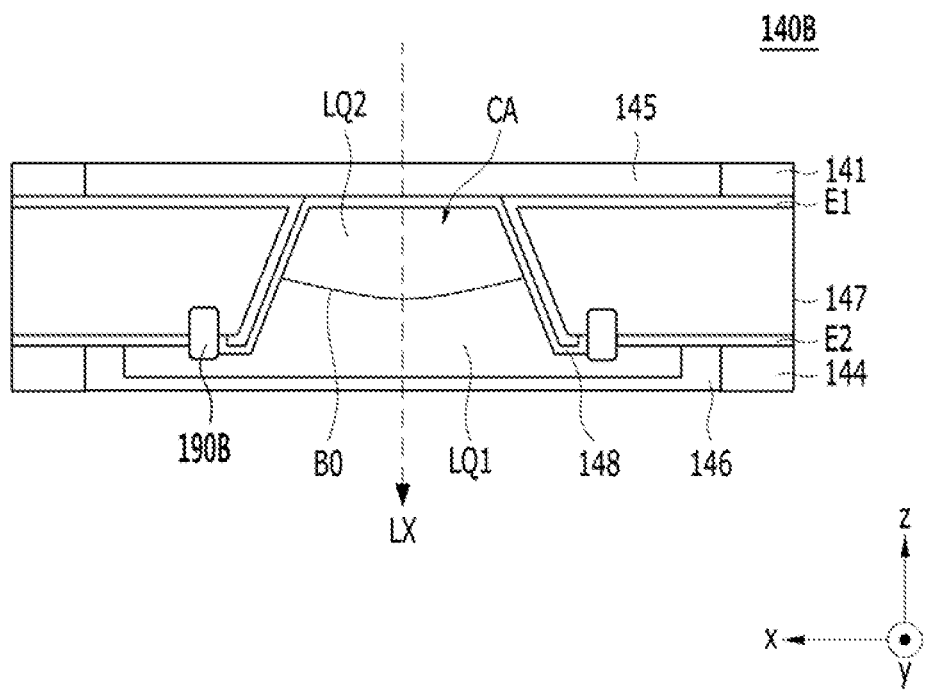
FIGS. 6 to 8 illustrate cross-sectional views of liquid lens units according to other embodiments.

First, in the liquid lens unit 140B shown in FIG. 6, an elastic member 190B may be disposed between the first electrode E1 or the insulation layer 148 and the second electrode E2 when viewed in plan (e.g. on the x-y plane). In this case, at least a portion of the elastic member 190B may be embedded in a receiving recess formed in the lower surface of the first plate 147 in a thickness direction (e.g. the z-axis). In this case, the elastic member 190B may be formed in the shape of a toroid having an annular planar shape, and when the pressure in the cavity CA increases due to an increase in temperature, the elastic member 190B may be deformed such that the lower portion thereof is compressed in the Z-axis direction.

In some embodiments, unlike what is illustrated in FIG. 6, the elastic member 190B may be embedded more deeply in the first plate 147 in the Z-axis direction so that only the lower surface thereof is in contact with the first liquid LQ1, or may further protrude in the −Z-axis direction so that a greater portion thereof is in contact with the first liquid LQ1. Further, in the case in which the elastic member 190B shown in FIG. 6 has a toroidal shape, the inner circumferential surface thereof may be in contact with the insulation layer 148, and the outer circumferential surface thereof may be in contact with the second electrode E2. However, in some embodiments, each of the inner and outer circumferential surfaces thereof may be spaced apart from at least one of the insulation layer 148 or the second electrode E2 in a plan view so as to avoid contact therewith. Further, referring to FIG. 6, the first electrode E1 is not in contact with the inner circumferential surface of the elastic member 190B due to the insulation layer 148. However, according to another embodiment, both the first electrode E1 and the insulation layer 148 may be in contact with the inner circumferential surface of the elastic member 190B. In this case, the first electrode E1 may be electrically insulated from the first liquid LQ1 by the insulation layer 148 and the elastic member 190B.

Figure 7:
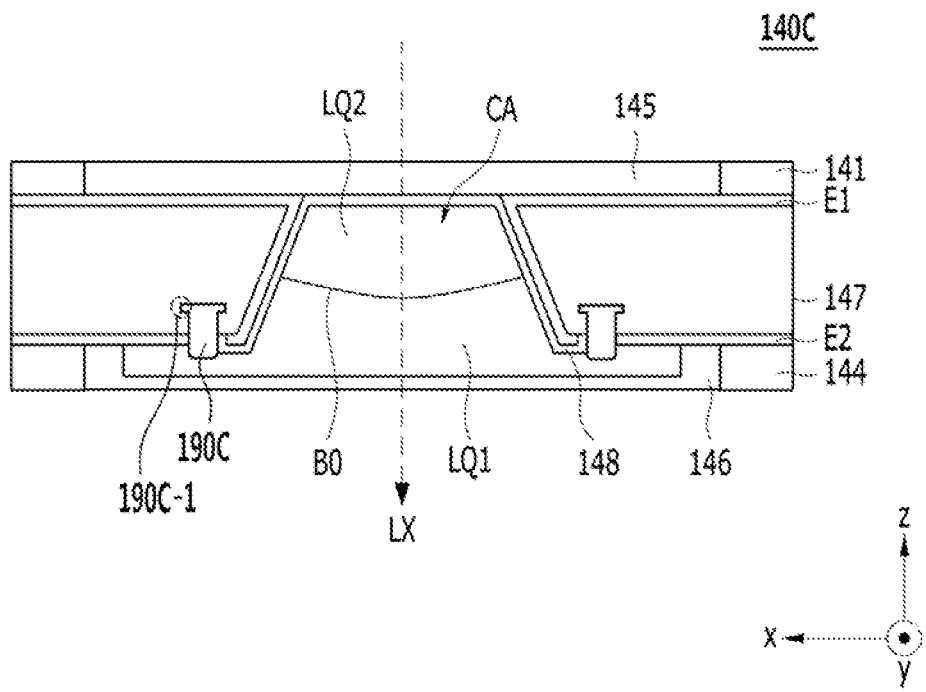

Next, an elastic member 190C of the liquid lens unit 140C shown in FIG. 7 may have a shape similar to that of the elastic member 190B shown in FIG. 6, and may further include a protruding portion 190C-1 formed at the upper portion thereof in order to be more stably received in the receiving recess in the first plate 147. In this case, the receiving recess in the first plate 147 may have a shape suitable for receiving the protruding portion 190C-1 as well.

Figure 8:
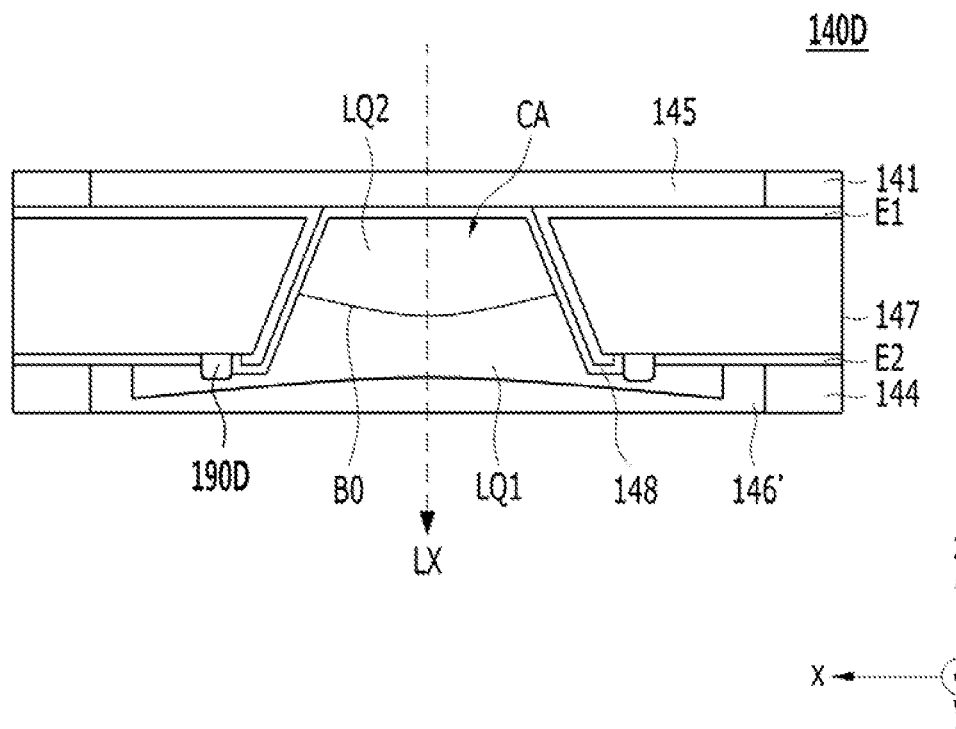

Alternatively, an elastic member 190D of the liquid lens unit 140D shown in FIG. 8 may be disposed on the lower surface of the first plate 147, rather than being received in the first plate 147. The position of the elastic member 190D relative to the first electrode E1, the second electrode E2, and the insulation layer 148 is the same as that described above with reference to FIG. 6, and thus a duplicate description thereof will be omitted. Further, referring to FIG. 8, the thickness to the upper surface of the third plate 146' in the vertical direction (e.g. the z-axis direction) may gradually increase in a direction from the edge thereof toward the optical axis LX. Due thereto, the center portion of the third plate 146', which is relatively vulnerable to deformation compared to the edge thereof, may be reinforced. Of course, this shape of the third plate 146' may also be applied to the liquid lens units 140A, 140B, 140C and 140E shown in FIGS. 5A to 7 described above and FIG. 9A to be described later. It is illustrated in FIG. 8 that the thickness to the upper surface of the third plate 146' gradually increases from the peripheral portion thereof to the center portion thereof in a curved cross-sectional shape, but the thickness may increase in a stepped cross-sectional shape.

Meanwhile, although the elastic member 190A, 190B, 190C or 190D is capable of preventing deformation of the third plate 146 or 146' by being deformed when the pressure in the cavity CA increases due to an increase in temperature, it is not capable of preventing a change in the position of the interface BO. Therefore, because a change in the position of the interface BO may cause a change in diopter, it is preferable to provide information on a change in the interface BO, i.e. the extents of expansion of the liquids LQ1 and LQ2, to a controller 210, which will be described later, in order to enable more accurate control of the diopter. The extents of expansion of the liquids LQ1 and LQ2 may be predicted based on the result of measurement of the extent of deformation of the elastic member. The configuration of the liquid lens unit for this will be described below with reference to FIGS. 9A to 9C.

Figure 9A:
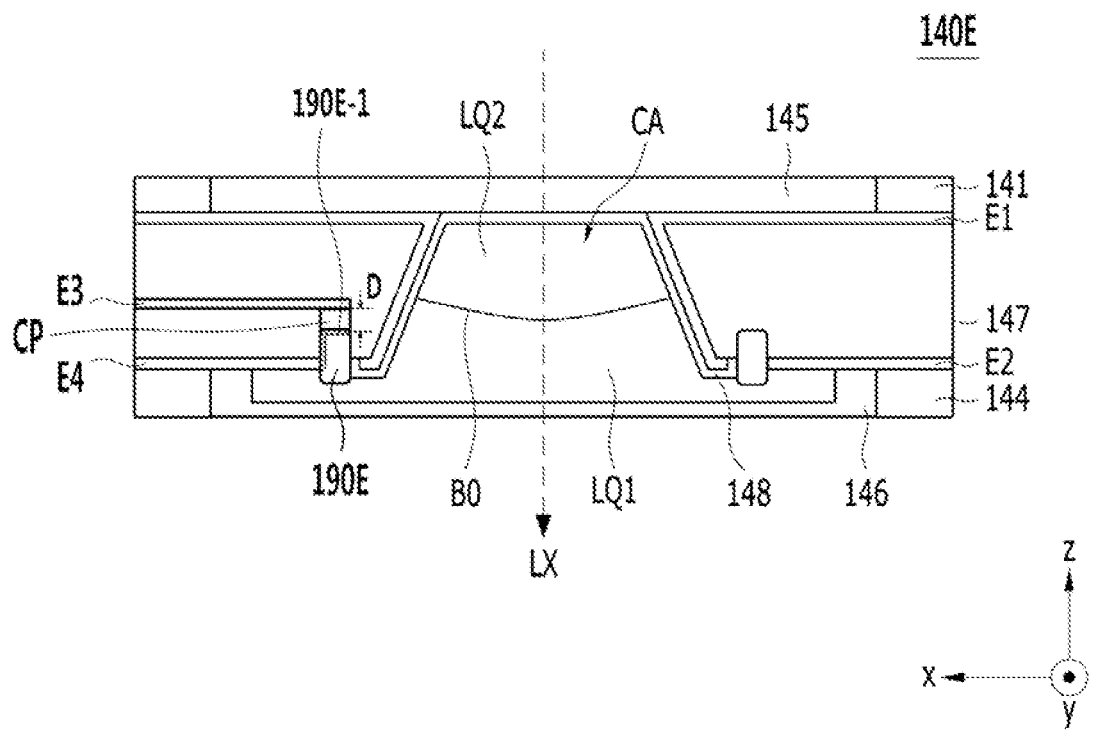
FIGS. 9A to 9C respectively illustrate a cross-sectional view, a perspective view, and a bottom view of a liquid lens unit according to still another embodiment.
Figure 9B:
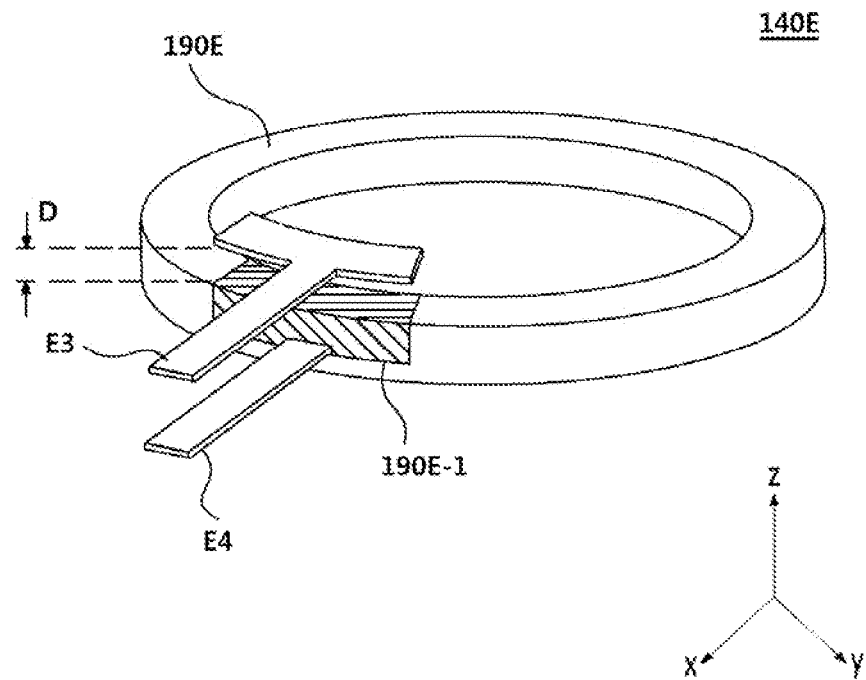

FIG. 9A is a cross-sectional view showing an example of the configuration of a liquid lens unit 140E according to still another embodiment, and FIG. 9B is a perspective view showing only an elastic member 190E, an electrode plate 190E-1, a third electrode E3, and a fourth electrode E4, among the components of the liquid lens unit 140E shown in FIG. 9A. In addition, FIG. 9C is a bottom view of the liquid lens unit 140E shown in FIG. 9A, from which a third plate 146 and a second connection substrate 144 are omitted.

Figure 9C:
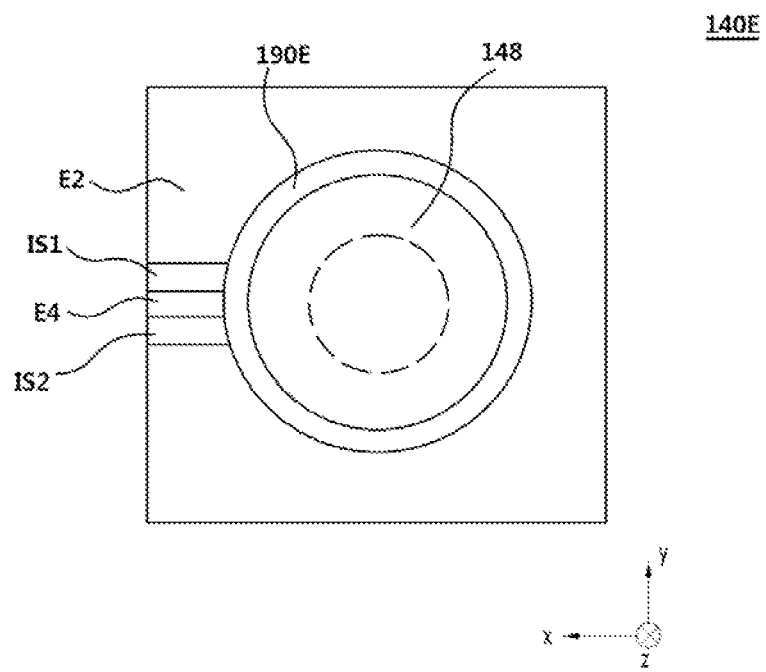

Referring to FIGS. 9A to 9C, an elastic member 190E of the liquid lens unit 140E has a configuration similar to that shown in FIG. 6. However, unlike what is illustrated in FIG. 6, referring to FIG. 9A, an electrode plate 190E-1 is disposed on the surface of at least a portion of the elastic member 190E, and is electrically connected to a fourth electrode E4. Specifically, assuming that the elastic member 190E has a toroidal shape, the electrode plate 190E-1 may be disposed over the outer circumferential surface and the upper surface of the elastic member 190E, and the portion of the electrode plate 190E-1 that is disposed on the outer circumferential surface may be electrically connected to the fourth electrode E4. The electrode plate 190E-1, the third electrode E3, and the fourth electrode E4 may include the same material as that of the first electrode E1 or the second electrode E2, or may be made of a material different therefrom.

The fourth electrode E4 may be disposed on the lower surface of the first plate 147, and may be disposed in the same plane as the second electrode E2. However, it is preferable that the fourth electrode E4 be insulated from the second electrode E2. For example, as shown in FIG. 9C, the fourth electrode E4 and the second electrode E2 may be insulated from each other by a first insulation part IS1 and a second insulation part IS2. Here, each of the first insulation part IS1 and the second insulation part IS2 may extend over the fourth electrode E4 so as to cover the entirety of the fourth electrode E4.

The third electrode E3 may extend from the edge of the first plate 147 toward the optical axis LX such that at least a portion of the lower surface thereof overlaps the electrode plate 190E-1, disposed on the upper surface of the elastic member 190E, in the vertical direction (e.g. the Z-axis direction).

The electrode plate 190E-1 disposed on the upper surface of the elastic member 190E may be spaced apart from the third electrode in the vertical direction, and a dielectric layer CP may be disposed between the electrode plate 190E-1, disposed on the upper surface of the elastic member 190E, and the third electrode E3 so that the elastic member 190E may move in the vertical direction (e.g. the Z-axis direction) depending on a change in the pressure in the cavity CA. The space corresponding to the dielectric layer CP may be formed by extending the receiving recess formed in the first plate 147, in which the elastic member 190E is received, a predetermined distance D in the Z-axis direction in a planar shape corresponding to the electrode plate 190E-1 disposed on the upper surface of the elastic member 190E. The dielectric layer CP may include a material having a uniform dielectric constant, and may be configured so as to be compressed in response to deformation and movement of the elastic member 190E. The embodiment is not limited as to the material composition or dielectric constant value of the dielectric layer CP.

Accordingly, capacitance is generated depending on the area corresponding to an area in which the third electrode E3, the electrode plate 190E-1 disposed on the upper surface of the elastic member 190E, and the dielectric layer CP overlap in the vertical direction, the vertical distance D between the third electrode E3 and the electrode plate 190E-1, and the dielectric constant of the dielectric layer CP. Specifically, this capacitance is proportional to the dielectric constant of the dielectric layer CP and the overlapping area, and is inversely proportional to the vertical distance D. Here, since the overlapping area and the dielectric constant of the dielectric layer CP are uniform, the actual capacitance varies depending on the vertical distance D. Accordingly, variation in the vertical distance D may be calculated by measuring variation in the capacitance between the third electrode E3 and the fourth electrode E4, and information on the expansion of the liquids LQ1 and LQ2 may be calculated based on variation in the vertical distance D. The expansion information may be converted into a compensation voltage for the first electrode E1 or the second electrode E2 in order to compensate for a change in the interface BO attributable to the expansion of the liquids LQ1 and LQ2. For example, when the vertical distance D increases, the compensation voltage may increase in proportion to the increase in the vertical distance D.

Accordingly, the liquid lens unit 140E according to still another embodiment is capable of preventing deformation attributable to an increase in temperature and of acquiring information for compensating for a change in the interface by virtue of the elastic member 190E, thereby enabling more accurate control of the diopter when the temperature increases.

Figure 10:
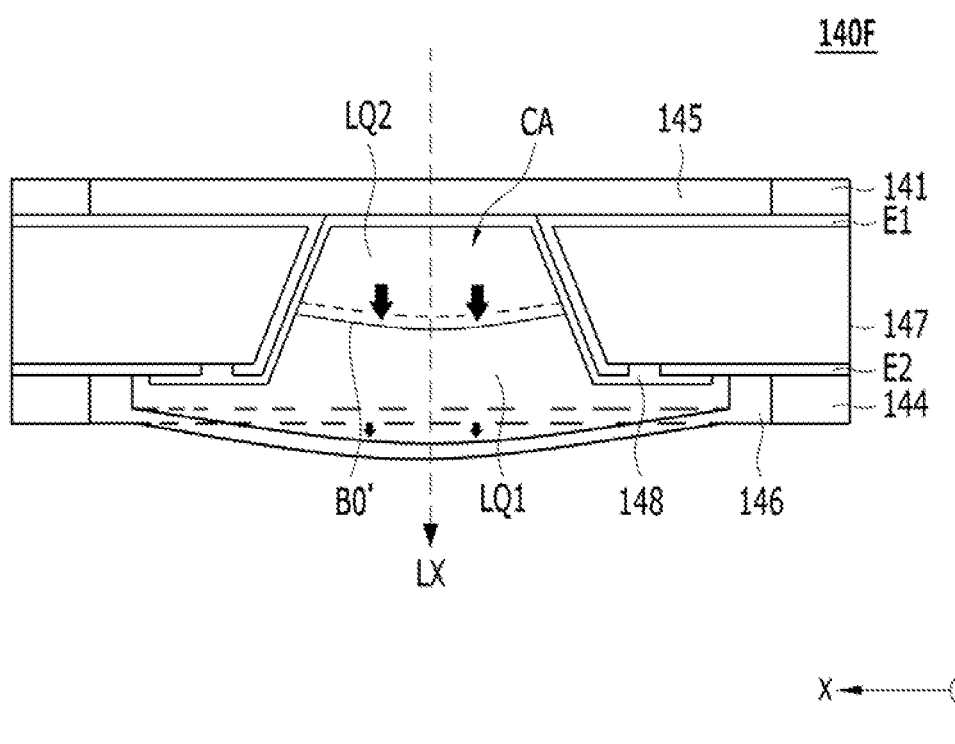
FIG. 10 illustrates a cross-sectional view of a liquid lens unit in the state in which a third plate thereof is deformed.

FIG. 10 illustrates the state in which a third plate of a liquid lens unit 140F, which has no elastic member, is deformed in order to explain the effects of the liquid lens units according to the embodiments of the present disclosure.

Because the liquid lens unit 140F shown in FIG. 10 does not include the elastic member 190A, 190B, 190C, 190D or 190E, the pressure in the cavity CA is not adjusted depending on an increase in temperature. Thus, the pressure in the cavity CA may be increased by an increase in the volume of the liquid, particularly the second liquid LQ2, whereby the third plate 146 may be deformed. Due to this deformation, the diopter may vary, and in severe cases, the third plate 146 may be damaged. In contrast, the liquid lens units 140A, 140B, 140C, 140D and 140E according to the embodiments have the elastic members 190A, 190B, 190C, 190D and 190E, whereby the risk of deformation of the liquid lens units 140A, 140B, 140C, 140D and 140E or damage thereto attributable to an increase in temperature may be reduced. A portion of the elastic member may be in contact with the liquid of the liquid lens, and may be pressed and contracted when the liquid contained in the liquid lens expands due to, for example, heat. The force applied to the plates constituting the liquid lens is alleviated by the contraction of the elastic member, with the result that the durability of the liquid lens may be improved, and variation in focal length attributable to bending of the plates may be reduced.

Figure 11:
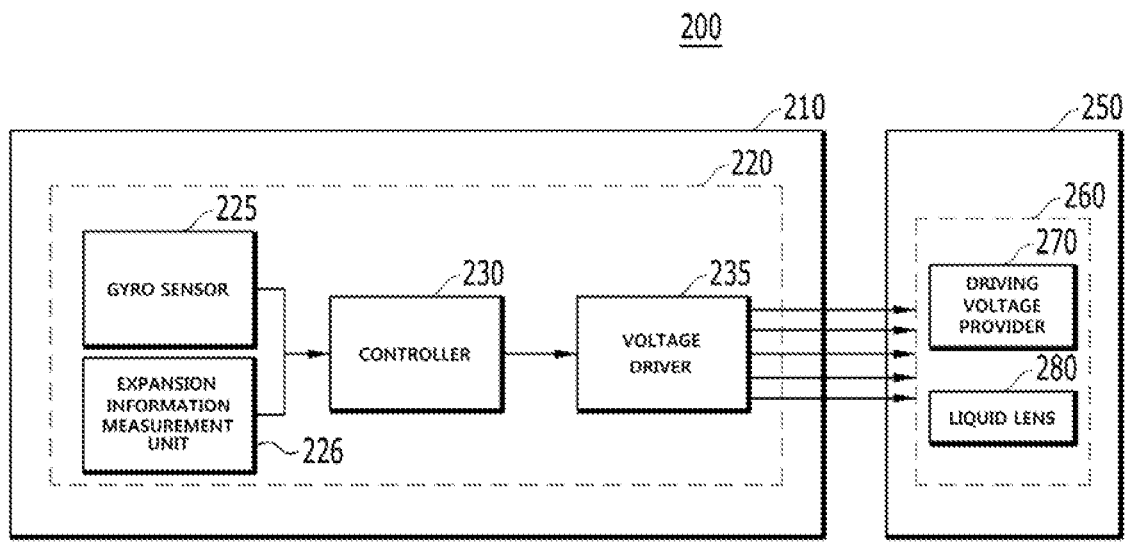
FIG. 11 is a schematic block diagram of a camera module.

FIG. 11 is a schematic block diagram of the camera module 200.

Referring to FIG. 11, the camera module 200 may include a control circuit 210 and a lens assembly 250. The control circuit 210 may correspond to the control circuit 24 shown in FIG. 1, and the lens assembly 250 may correspond to the lens assembly 22 shown in FIG. 1 or the lens assembly 110, 120, 130 and 140 shown in FIG. 2.

The control circuit 210 may include a control unit 220, and may control the operation of the liquid lens unit 140 including a liquid lens 280.

The control unit 220 may have a configuration for performing an AF function and an OIS function, and may control the liquid lens 280 included in the lens assembly 250 using a user request or a result of detection (e.g. a motion signal of a gyro sensor 225). Here, the liquid lens 280 may correspond to the above-described liquid lens 142.

The control unit 220 may include a gyro sensor 225, a controller 230, and a voltage driver 235. The gyro sensor 225 may be an independent component that is not included in the control unit 220, or may be included in the control unit 220.

The gyro sensor 225 may sense the angular velocity of movement in two directions, including a yaw-axis direction and a pitch-axis direction, in order to compensate for hand tremor in the vertical and horizontal directions of the optical device. The gyro sensor 225 may generate a motion signal corresponding to the sensed angular velocity, and may provide the motion signal to the controller 230.

The controller 230 may remove a high frequency noise component from the motion signal using a low pass filter (LPF) so as to extract only a desired frequency band for implementation of an OIS function, may calculate the amount of hand tremor using the motion signal from which the noise has been removed, and may calculate a driving voltage corresponding to the shape that the liquid lens 280 of the liquid lens module 260 needs to have in order to compensate for the calculated amount of hand tremor.

Particularly, the control unit 220 according to the embodiment may further include an expansion information measurement unit 226. The expansion information measurement unit 226 may measure variation in the capacitance between the third electrode E3 and the fourth electrode E4 shown in FIGS. 9A to 9C, and may provide a compensation voltage for compensating for a change in the interface BO attributable to expansion of the liquids LQ1 and LQ2 to the controller 230 based thereon.

The controller 230 may receive information for an AF function (i.e. information on the distance to an object) from an internal component (e.g. an image sensor 182) or an external component (e.g. a distance sensor or an application processor) of the optical device or the camera module 200, and may calculate a driving voltage corresponding to the desired shape of the liquid lens 280 based on a focal length, which is required to focus on the object, using the distance information. Here, upon calculating the driving voltage, the controller 230 may take into consideration the compensation voltage acquired from the expansion information measurement unit 226.

The controller 230 may store a driving voltage table in which a driving voltage and a driving voltage code for making the voltage driver 235 generate the driving voltage are mapped, may acquire a driving voltage code corresponding to the calculated driving voltage by referring to the driving voltage table, and may output the acquired driving voltage code to the voltage driver 235.

The voltage driver 235 may generate, based on a driving voltage code in a digital form provided from the controller 230, a driving voltage in an analog form corresponding to the driving voltage code, and may provide the driving voltage to the lens assembly 250.

The voltage driver 235 may include a voltage booster, which increases a voltage level upon receiving a supply voltage (e.g. a voltage supplied from a separate power supply circuit), a voltage stabilizer for stabilizing the output of the voltage booster, and a switching unit for selectively supplying the output of the voltage booster to each terminal of the liquid lens 280.

Here, the switching unit may include a circuit component called an H bridge. A high voltage output from the voltage booster is applied as a power supply voltage of the switching unit. The switching unit may selectively supply the applied power supply voltage and a ground voltage to opposite ends of the liquid lens 280. Here, as described above, the liquid lens 280 may include the four first electrodes E1 including four electrode sectors, the first connection substrate 141, the second electrode E2, and the second connection substrate 144 for driving. Opposite ends of the liquid lens 280 may mean any one of the plurality of first electrodes E1 and the second electrode E2. In addition, opposite ends of the liquid lens 280 may mean any one of the four electrode sectors of the four first electrodes E1 and one electrode sector of the second electrode E2.

A pulse-type voltage having a predetermined width may be applied to each electrode sector of the liquid lens 280, and the driving voltage applied to the liquid lens 280 is the difference between the voltages applied to each of the first electrodes E1 and the second electrode E2.

In addition, in order to allow the voltage driver 235 to control the driving voltage applied to the liquid lens 280 depending on a driving voltage code in a digital form provided from the controller 230, the voltage booster may control an increase in a voltage level, and the switching unit may control the phase of a pulse voltage applied to the common electrode and the individual electrodes so as to generate a driving voltage in an analog form, which corresponds to the driving voltage code.

That is, the control unit 220 may control the voltage applied to each of the first electrodes E1 and the second electrode E2.

The control circuit 210 may further include a connector (not shown), which performs a communication or interface function of the control circuit 210. For example, the connector may perform communication protocol conversion for communication between the control circuit 210, which uses an inter-integrated circuit (I2C) communication method, and the lens assembly 250, which uses a mobile industry processor interface (MIPI) communication method. In addition, the connector may receive power from an external source (e.g. a battery), and may supply power required for the operation of the control unit 220 and the lens assembly 250. In this case, the connector may correspond to the connector 153 shown in FIG. 2.

The lens assembly 250 may include the liquid lens module 260, and the liquid lens module 260 may include a driving voltage provider 270 and the liquid lens 280.

The driving voltage provider 270 may receive a driving voltage from the voltage driver 235, and may provide the driving voltage to the liquid lens 280. Here, the driving voltage may be an analog voltage applied between any one of the "n" individual electrodes and one common electrode.

The driving voltage provider 270 may include a voltage adjustment circuit (not shown) or a noise removal circuit (not shown) for compensating for loss due to terminal connection between the control circuit 210 and the lens assembly 250, or may divert the voltage provided from the voltage driver 235 to the liquid lens 280.

The driving voltage provider 270 may be disposed on an FPCB (or a substrate), which constitutes at least a portion of the connection part 152, but the embodiment is not limited thereto. The connection part 152 may include the driving voltage provider 270.

The liquid lens 280 may be deformed in the interface BO thereof between the first liquid LQ1 and the second liquid LQ2 depending on a driving voltage, thereby performing at least one of an AF function or an OIS function.

Figure 12:
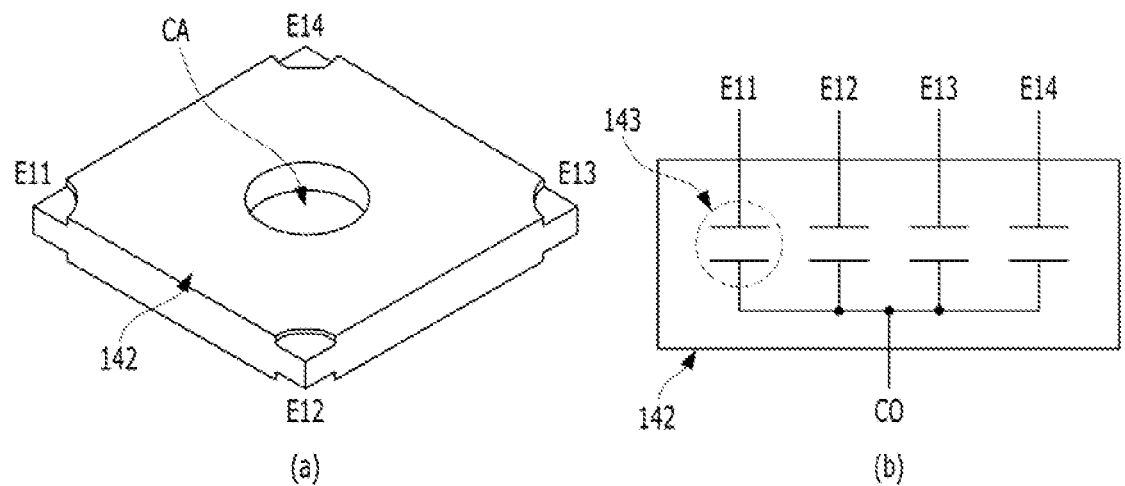
FIGS. 12(a) and (b) are views for explaining a liquid lens, the interface of which is adjusted in response to a driving voltage.

FIGS. 12(a) and (b) are views for explaining the liquid lens 142, the interface of which is adjusted in response to a driving voltage. Specifically, FIG. 12(a) illustrates a perspective view of the liquid lens 142 according to the embodiment, and FIG. 12(b) illustrates an equivalent circuit of the liquid lens 142. Here, the liquid lens 142 is the same as the liquid lens 142 of FIG. 2, and thus is designated by the same reference numeral.

First, referring to FIG. 12(a), the liquid lens 142, the interface BO of which is adjusted in shape in response to a driving voltage, may receive the driving voltage via a plurality of electrode sectors E1l, E12, E13 and E14 of the plurality of first electrodes E1, which are disposed in four different directions to have the same angular distance therebetween, and an electrode sector CO of the second electrode E2. When the driving voltage is applied via any one of the plurality of electrode sectors E1l, E12, E13 and E14 of the plurality of first electrodes E1 and the electrode sector CO of the second electrode E2, the shape of the interface BO between the first liquid LQ1 and the second liquid LQ2, which are disposed in the cavity CA, may be deformed. The extent of deformation and the shape of the interface BO between the first liquid LQ1 and the second liquid LQ2 may be controlled by the controller 230 in order to implement at least one of an AF function or an OIS function.

In addition, referring to FIG. 12(b), the liquid lens 142 may be explained as a plurality of capacitors 143, in which one side of the liquid lens 142 receives a voltage from the different electrode sectors E1l, E12, E13 and E14 of the first electrodes E1, and the other side of the liquid lens 142 is connected to the electrode sector CO of the second electrode E2 so as to receive a voltage therefrom.

In FIG. 12(a), the number of different electrode sectors E1l, E12, E13 and E14 included in the plurality of first electrodes E1 is illustrated as being four, but the embodiment is not limited thereto.

Although only a limited number of embodiments have been described above, various other embodiments are possible. The technical contents of the above-described embodiments may be combined into various forms as long as they are not incompatible with one another, and thus may be implemented in new embodiments.

Although only a limited number of embodiments have been described above, various other embodiments are possible. The technical contents of the above-described embodiments may be combined into various forms as long as they are not incompatible with one another, and thus may be implemented in new embodiments.

Meanwhile, an optical device may be implemented using the camera module 100A or 100B including the lens assembly according to the embodiment described above. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a lens assembly.

In addition, the optical device may be implemented in a portable device such as, for example, a smartphone, a laptop computer, or a tablet computer. Such an optical device may include the camera module 100, a display unit (not shown) configured to output an image, a battery (not shown) configured to supply power to the camera module 100, and a body housing in which the camera module 100, the display unit, and the battery are mounted. The optical device may further include a communication module, which may communicate with other devices, and a memory unit, which may store data. The communication module and the memory unit may also be mounted in the body housing.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

The invention claimed is:

1. A liquid lens, comprising:
a first plate comprising a cavity accommodating a first liquid and a second liquid, the first liquid being conductive and the second liquid being non-conductive;
a first electrode disposed on the first plate;
a second electrode disposed under the first plate;
a second plate disposed on the first electrode;
a third plate disposed under the second electrode; and
an elastic member disposed between the first plate and the third plate, the elastic member being configured to be deformable such that a volume of the elastic member is reduced when a volume of the first liquid or a volume of the second liquid increases.

2. The liquid lens according to claim 1, wherein at least a portion of the elastic member is received in a receiving recess disposed in the lower surface of the first plate.

3. The liquid lens according to claim 1, wherein the first electrode extends along a side surface and a lower surface of the first plate that forms a sidewall of the cavity, and
wherein the elastic member is disposed on the lower surface of the first plate between the first electrode and the second electrode and has a toroidal shape.

4. A liquid lens, comprising:
a first plate comprising a cavity accommodating a first liquid and a second liquid, the first liquid being conductive and the second liquid being non-conductive;
a first electrode disposed on the first plate, the first electrode extending along a side surface and a lower surface of the first plate that forms a sidewall of the cavity;
a second electrode disposed under the first plate;
a second plate disposed on the first electrode;
a third plate disposed under the second electrode; and
an elastic member disposed between the first plate and the third plate, the elastic member being disposed on the lower surface of the first plate between the first electrode and the second electrode, the elastic member having a toroidal shape, the elastic member having an electrode plate disposed over at least portions of an upper surface and an outer circumferential surface thereof,
wherein the liquid lens further comprises:
a third electrode disposed inside the first plate;
a dielectric layer disposed between the third electrode and the electrode plate disposed on the upper surface of the elastic member; and
a fourth electrode disposed on the lower surface of the first plate so as to be electrically connected to the electrode plate disposed on the outer circumferential surface, and
wherein the third electrode, the dielectric layer, and the electrode plate disposed on the outer circumferential surface at least partially overlap each other in a vertical direction.

5. A lens assembly, comprising:
a holder comprising a first opening and a second opening facing the first opening in a direction perpendicular to an optical-axis direction; and
a liquid lens unit disposed between the first opening and the second opening,
wherein the liquid lens unit comprises:
a first plate comprising a cavity accommodating a first liquid and a second liquid, the first liquid being conductive and the second liquid being non-conductive;
a first electrode disposed on the first plate;
a second electrode disposed under the first plate;
a second plate disposed on the first electrode;
a third plate disposed under the second electrode; and
an elastic member contacting with the first liquid, the elastic member being configured to be pressed and contracted by expansion of the first liquid.

* * * * *